US006896858B2

(12) United States Patent
Tatani et al.

(10) Patent No.: US 6,896,858 B2
(45) Date of Patent: May 24, 2005

(54) GAS REFINING SYSTEM

(75) Inventors: Atsushi Tatani, Tokyo (JP); Makoto Susaki, Tokyo (JP); Kazuaki Kimura, Tokyo (JP); Taku Shimizu, Tokyo (JP); Toshikuni Sera, Hiroshima-ken (JP); Kenji Inoue, Hiroshima-ken (JP)

(73) Assignee: Mitsubishi Jukogyo Kabushiki Kaisha, Tokyo (JP)

( * ) Notice: Subject to any disclaimer, the term of this patent is extended or adjusted under 35 U.S.C. 154(b) by 755 days.

(21) Appl. No.: 09/781,884

(22) Filed: Feb. 12, 2001

(65) Prior Publication Data

US 2001/0009649 A1 Jul. 26, 2001

Related U.S. Application Data

(60) Continuation of application No. 09/129,911, filed on Aug. 6, 1998, now abandoned, which is a division of application No. 08/655,735, filed on May 30, 1996, now Pat. No. 5,824,273.

(30) Foreign Application Priority Data

Jun. 23, 1995 (JP) ........................................ 7-157688
Jun. 23, 1995 (JP) ........................................ 7-157689

(51) Int. Cl.[7] ........................... C01F 11/46; C01J 3/00; B01D 53/34; B01D 53/48

(52) U.S. Cl. ............... 423/242.1; 423/230; 423/243.03; 423/244.02; 423/555; 423/570; 48/198.7

(58) Field of Search ................................ 422/169–171, 422/110; 48/198.7; 423/230, 243.03, 244.02, 570, 555, 242.1

(56) References Cited

U.S. PATENT DOCUMENTS 4,955,586 A 9/1990 Onizuka et al. .............. 261/87
5,009,873 A * 4/1991 Kerr et al. .................. 423/320
5,132,027 A 7/1992 Ukawa et al. .............. 423/555
5,980,846 A * 11/1999 Tatani et al. ................ 423/230

FOREIGN PATENT DOCUMENTS

| | | | |
|---|---|---|---|
| DE | 3721421 | A1 | 1/1989 |
| EP | 0 338 967 | A1 | 10/1989 |
| EP | 0 604 701 | A1 | 7/1994 |
| JP | 55-111826 | A | 8/1980 |
| WO | WO 88/04648 | | 6/1988 |
| WO | WO 91/18131 | | 11/1991 |

OTHER PUBLICATIONS

Patent Abstracts of Japan, vol. 14, No. 007 (C–673), Jan. 10, 1989, from JP 01 254226A dated Oct. 11, 1989.

International Search Report.

Abstract, Japanese Patent Provisional Publication No. 63–123801 (123801/1988).

Abstract, Japanese Patent Provisional Publication No. 1–254226 (254226/1889).

* cited by examiner

*Primary Examiner*—Hien Tran
(74) *Attorney, Agent, or Firm*—Alston & Bird LLP

(57) ABSTRACT

A gas refining method for adsorbing a reducing gas obtained by pressure gasification of coal or oil comprises introducing a reducing gas stream into an adsorbing and removing zone where it contacts an adsorbent. Sulfur-containing compounds are adsorbed onto the adsorbent and a first oxygen-containing gas stream is introduced into the adsorbing and removing zone in order to form a regeneration gas containing sulfur dioxide. The regeneration gas is contacted with a second oxygen-containing stream and a calcium-containing liquid slurry to effect absorption of sulfur dioxide by the slurry and precipitation of a gypsum compound. The temperature of the slurry is varied to cause selective precipitation of 60 -gypsum hemihydrate or gypsum dihydrate.

7 Claims, 4 Drawing Sheets

GAS REFINING SYSTEM

This application is a continuation of U.S. application Ser. No. 09/129,911, filed Aug. 6, 1998, now abandoned, which is a divisional of U.S. application Ser. No. 08/655,735; filed May 30, 1996, now U.S. Pat. No. 5,824,273.

BACKGROUND OF THE INVENTION

1. Field of the Invention

This invention relates to a gas refining system for removing hydrogen sulfide contained in high-temperature and high-pressure reducing gases such as gas produced in a coal gasification process. More particularly, it relates to a gas refining system wherein either α-gypsum hemihydrate or gypsum dihydrate can be selectively formed as a by-product and, moreover, the reactor for forming such gypsum can be reduced in size or simplified.

2. Description of the Related Art

In recent years, the diversification of fuels (or raw materials) is advocated because of the exhaustion and rising cost of petroleum resources, and the development of techniques for utilizing coal and heavy oils (e.g., tar sand oil, shale oil, Taching heavy oil, Maya crude oil and vacuum distillation residue) has been promoted. As an example, attention has been paid to techniques for gasifying coal and heavy oils to utilize them for electric power generation and to produce fuels and raw materials for use in syntheses.

However, such gases obtained by the gasification of coal and heavy oils contain several hundred to several thousand parts per million of hydrogen sulfide, which must be removed for the purpose of preventing environmental pollution or protecting downstream equipment (e.g., gas turbines) against corrosion. Among the processes for removing hydrogen sulfide are dry processes which are advantageous from the viewpoint of thermal economy and simple in construction. One conventionally known example thereof is the dry gas refining process described in Japanese Patent Provisional Publication Nos. 63-123801 and 1-254226.

This gas refining process uses an oxide of a metal (e.g., Fe) as an adsorbent, sulfur compounds contained in a gas are adsorbed and removed by the adsorbent in the form of a sulfide, the adsorbent with reduced adsorption capacity is regenerated by roasting it with an oxygen-containing gas, and the regeneration gas containing sulfur dioxide formed by the roasting reaction is introduced into a reactor. In this reactor, using a gas blowing means, the regeneration gas and an oxygen-containing gas (usually comprising air) are blown into a calcium compound-containing slurry fed to the reactor, and thereby brought into gas-liquid contact with the slurry to effect the absorption of sulfur dioxide and the precipitation of gypsum within the reactor. In this process, α-gypsum hemihydrate is formed as a by-product by maintaining the temperature of the slurry within the reactor at 120–180° C.

As described in the above-referenced patent publications, the reactor used in this gas refining process consists of a pressure vessel which permits the regeneration gas and air for oxidization to be blown into the reactor under an elevated pressure (e.g., of 10 kg/cm$^2$) and brought into gas-liquid contact with the calcium compound-containing slurry. As a gas blowing means, a so-called rotary atomizer has usually been employed.

This rotary atomizer comprises a hollow rotating shaft extending through the bottom of the reactor, and a gas is injected from the upper end of this hollow rotating shaft while it is rotated. However, since the injected gas bubbles have a relatively large diameter and its agitating action is weak, the gas bubbles are distributed only in a relatively limited area around the injection orifice provided at the upper end of the hollow rotating shaft.

As described in the above-referenced patent publications, the conventional gas refining process is designed so that only α-gypsum hemihydrate is formed as a by-product. This involves the following problems.

(1) Although α-gypsum hemihydrate ($CaSO_4.1/2H_2O$) has a relatively high commercial value in itself, the supply of water of crystallization converts it to gypsum dihydrate ($CaSO_4.2H_2O$). Accordingly, α-gypsum hemihydrate is sensitive to moisture, cannot be stored outdoors, and must be stored and conveyed under protection from moisture. Thus, its handling is very troublesome.

(2) In addition to the problem of protection from moisture which makes it difficult to store α-gypsum hemihydrate for a long period of time, the market (or demand) for α-gypsum hemihydrate is rather limited. According to the conditions of the market, therefore, it may be difficult to recover a high profit. Especially when the above-described gas refining process has come to be employed on a full scale in such facilities as electric power plants, there is a possibility that its supply will become excessive and its commercial value will decline steadily.

(3) On the other hand, gypsum dihydrate generally has a relatively low commercial value at present. However, it has sufficient characteristics for use, for example, as a raw material for the manufacture of cement which has a large market. Moreover, it can be stored outdoors and handled easily. Consequently, if it is possible to switch the by-product over to gypsum dehydrate according to circumstances and produce α-gypsum hemihydrate only when there is an active demand in the market, this will be advantageous from the viewpoint of profit recovery and other factors. However, this cannot be easily realized in the conventional gas refining process.

Moreover, in the above-described conventional gas refining process, the elevated pressure of the gases blown into the reactor (i.e., the regeneration gas and air for oxidization) reduces gas volume. In principle, therefore, the size of the reactor can be markedly reduced (especially in diameter) as compared with the case where the gas-liquid contact is effected at atmospheric pressure. This is highly advantageous, for example, in that a reduction in floor space can be achieved.

However, the use of a rotary atomizer as the gas blowing means makes it difficult to blow the regeneration gas and air for oxidization in the form of fine bubbles and distribute them uniformly throughout the internal space of the reactor. Eventually, the advantage brought about by blowing the gases under an elevated pressure (i.e., a reduction in size of the reactor) cannot be fully realized. Moreover, this also has the disadvantage of complicating the structure of the reactor.

As described above, a rotary atomizer has the disadvantage that, since the injected gas bubbles have a relatively large diameter and its scattering action is weak, the resulting contact efficiency is low. Accordingly, even if the gas bubbles can be distributed to the same extent in the lateral direction, the absorption and oxidation reactions do not proceed satisfactorily. As a result, it has been necessary to secure a large effective volume for gas-liquid contact, for example, by significantly increasing the vertical dimension of the reactor (or by considerably elevating the surface level of the slurry).

Moreover, as described above, the rotary atomizer causes gas bubbles to be distributed only in a relatively limited area around the injection orifice (having a maximum diameter of about 30 cm for practical purposes) provided at the upper end of the hollow rotating shaft. Accordingly, if it is desired to have gas bubbles distributed throughout the internal space of a reactor having an internal diameter, for example, of about 3 meters, it is necessary to install a plurality of rotary atomizer in side-by-side relationship at the bottom of the reactor. This has the disadvantage of complicating the structure of the reactor and causing an increase in cost.

Especially in the conventional construction where the motor of the rotary atomizer is disposed outside the reactor and its rotating shaft extends through the wall of the reactor, a special seal capable of withstanding the pressure difference between the inside and outside of the reactor needs to be used at that part of the wall through which the rotating shaft extends. This is very disadvantageous from a practical point of view.

SUMMARY OF THE INVENTION

It is an object of a first aspect of the present invention to provide a gas refining system wherein either α-gypsum hemihydrate or gypsum dihydrate can be selectively and easily formed as a by-product.

According to the first aspect of the present invention, the above object is accomplished by a gas refining system wherein sulfur compounds contained in a high-temperature and high-pressure reducing gas obtained by pressure gasification of coal or heavy oil are adsorbed and removed in the form of a sulfide by an adsorbent; the adsorbent having the sulfide formed thereon is regenerated by roasting it with an oxygen-containing gas; a regeneration gas containing sulfur dioxide formed by a roasting reaction is introduced into a reactor where the regeneration gas and an oxygen-containing gas are blown into a calcium compound-containing slurry fed to the reactor and brought into gas-liquid contact with the slurry to effect the absorption of sulfur dioxide and the precipitation of gypsum within the reactor; and temperature control means is provided for selectively controlling a temperature of the slurry within the reactor so as to fall within at least a first temperature range which causes α-gypsum hemihydrate to precipitate or a second temperature range which causes gypsum dihydrate to precipitate.

In a first embodiment of this gas refining system, the aforesaid temperature control means comprises a temperature sensor for detecting the temperature of the slurry within the reactor, a coolant passage formed around the reactor, a flow control valve for controlling a flow rate of a coolant passing through the coolant passage, and a temperature controller for controlling an opening of the flow control valve according to a deviation of an output value of the temperature sensor from a target value in such a direction as to cause the output value of the temperature sensor to agree with the target value, and the target value of the temperature controller can be selectively preset so as to fall within at least the first temperature range or the second temperature range.

In a second embodiment of this gas refining system, a gas produced over a surface of the slurry within the reactor is discharged from the reactor as regeneration recycle gas and recycled for use as the oxygen-containing gas in the roasting reaction of the adsorbent, and the gas refining system is further provided with oxygen feed rate control means for continuously adjusting a flow rate of the oxygen-containing gas blown into the slurry within the reactor to a value corresponding to the sum of an amount of oxygen required to completely oxidize sulfurous acid absorbed into the slurry and the amount of oxygen required for the roasting reaction of the adsorbent.

It is an object of a second aspect of the invention to provide a gas refining system in which the reactor for effecting the absorption of sulfur dioxide present in the regeneration gas and the formation of gypsum can be reduced in size and simplified beyond the above-described limits of the prior art.

According to the second aspect of the present invention, the above object is accomplished by a gas refining system wherein sulfur compounds contained in a high-temperature and high-pressure reducing gas obtained by the pressure gasification of coal or heavy oil are adsorbed and removed in the form of a sulfide by an adsorbent; the adsorbent having the sulfide formed thereon is regenerated by roasting it with an oxygen-containing gas; the regeneration gas containing sulfur dioxide formed by a roasting reaction is introduced into a reactor where, by use of gas blowing means, the regeneration gas and an oxygen-containing gas are blown into a calcium compound-containing slurry fed to the reactor and brought into gas-liquid contact with the slurry to effect the absorption of sulfur dioxide and the precipitation of gypsum within the reactor; a pressure vessel is provided into which the regeneration gas can be blown under a pressure at least higher than atmospheric pressure; and the gas blowing means comprises a stirring rod disposed in a lower part of the reactor so as to be horizontally rotatable and at least a gas supply pipe disposed integrally with the stirring rod for injecting the regeneration gas and the oxygen-containing gas in the vicinity of the stirring rod.

In a third embodiment of the gas refining system, according to the second aspect of the invention, the reactor comprises a rotary joint for connecting a fixed pipe for supplying the regeneration gas and the oxygen-containing gas with the gas supply pipe rotating together with the stirring rod, and a motor for driving the stirring rod and the gas supply pipe into rotation, the rotary joint and the motor being disposed within the reactor.

According to the first aspect of the present invention, temperature control means is used to selectively control the temperature of the slurry within the reactor so as to fall within at least a first temperature range which causes α-gypsum hemihydrate to precipitate or a second temperature range which causes gypsum dihydrate to precipitate. Consequently, either α-gypsum hemihydrate or gypsum dihydrate can be selectively formed by changing the temperature control range of this temperature control means.

For example, in the first embodiment of this gas refining system, α-gypsum hemihydrate is formed by presetting the control target value of a temperature controller so as to fall within the first temperature range, and gypsum dihydrate is formed by presetting the control target value of the temperature controller so as to fall within the second temperature range.

In the second embodiment of this gas refining system, the gas produced over the surface of the slurry within the reactor (i.e., a mixture of the regeneration gas blown into the slurry and freed of sulfur dioxide by absorption during its ascent through the slurry, and the oxygen-containing gas blown into the slurry and left unreacted) is discharged from the reactor as regeneration recycle gas and recycled for use as the oxygen-containing gas in the roasting reaction of the adsorbent. On the other hand, by use of oxygen feed rate control means, the flow rate of the oxygen-containing gas blown into the slurry within the reactor is continuously adjusted to a value corresponding to the sum of the amount of oxygen required to completely oxidize the sulfurous acid absorbed into the slurry and the amount of oxygen required for the roasting reaction of the adsorbent. Consequently, part of the oxygen present in the oxygen-containing gas blown into the slurry within the reactor (i.e., the oxygen which has not reacted within the reactor) is used in the roasting reaction of the adsorbent and its amount is continuously adjusted to the amount which is necessary and sufficient for the roasting reaction.

According to the second aspect of the present invention, the reactor comprises a pressure vessel into which the regeneration gas can be blown under an elevated pressure. Since the elevated pressure of the gases blown into the reactor (i.e., the regeneration gas and air for oxidizing use) causes a reduction in gas volume, the size of the reactor can be markedly reduced (especially in diameter) as compared with the case where the gas-liquid contact is effected at atmospheric pressure.

Moreover, the gas blowing means comprises a stirring rod disposed in the lower part of the reactor so as to be horizontally rotatable, and at least a gas supply pipe disposed integrally with the stirring rod for injecting the regeneration gas and the oxygen-containing gas in the vicinity of the stirring rod. Consequently, when the stirring rod is rotated with the regeneration gas and the oxygen-containing gas being injected from the gas supply pipe, the supply of the regeneration gas and the oxygen-containing gas steadily creates gas-phase areas on the back side of the stirring rod. At the tail ends of these gas-phase areas, the regeneration gas and the oxygen-containing gas are subjected to a scattering action exerted by vortex forces resulting from the rotation of the stirring rod. Thus, a large number of substantially uniform fine bubbles of the regeneration gas and the oxygen-containing gas are continuously formed at the tail ends of the gas-phase areas. These bubbles are distributed over a wide area swept by the rotating stirring rod and dragged into the flow of the slurry stirred by the stirring rod, so that they ascend through the slurry within the reactor and come into efficient contact therewith.

Furthermore, when a rotary joint for connecting a fixed pipe for supplying the regeneration gas and the oxygen-containing gas with the gas supply pipe, and a motor for driving the stirring rod and the gas supply pipe into rotation are disposed within the reactor, the rotating shaft need not extend through the wall of the reactor. This eliminates the necessity of using a special seal.

Next, the effects of the present invention are summarized.

In the gas refining system of the present invention, either α-gypsum hemihydrate or gypsum dihydrate can be selectively formed as a by-product by changing the temperature control range of the temperature control means. This is advantageous from the viewpoint of profit recovery by the by-product and other factors. For example, only when there is a sufficient demand for α-gypsum hemihydrate in the market, α-gypsum hemihydrate may be produced and sold soon. Thus, the trouble of storing α-gypsum hemihydrate can be saved and, moreover, the recovery of a large profit can be achieved by making the most of the high utility value inherently possessed by α-gypsum hemihydrate. Alternatively, when there is a poor demand for (or an excessive supply of) α-gypsum hemihydrate, the by-product may be switched over to gypsum dihydrate which is easy to store and convey. By selling this gypsum dihydrate at an appropriate opportunity, a reasonable profit can be gained without taking much trouble.

According to the second embodiment of this gas refining system, part of the oxygen present in the oxygen-containing gas blown into the slurry within the reactor (i.e., the oxygen which has not reacted within the reactor) is used in the roasting reaction of the adsorbent and its amount is continuously adjusted to the amount which is necessary and sufficient for the roasting reaction. Consequently, it is unnecessary to install a separate oxygen-containing gas supply line which is connected, for example, to an appropriate point on the line for conducting the regeneration recycle gas to the reaction towers and used to supply an oxygen-containing gas thereto, and an oxygen-containing gas can be supplied to the whole system by using a single oxygen-containing gas supply line (i.e., a supply line for blowing an oxygen-containing gas into the reactor). This makes it possible to simplify the piping design and equipment construction of the system and, in turn, achieve a reduction in the size and cost of the system.

Moreover, in the gas refining system in accordance with the second aspect of the present invention, the regeneration gas and the oxygen-containing gas, which are introduced into the reactor, are blown in the form of fine bubbles by the gas blowing means and distributed throughout the internal space of the reactor. Thus, the reactions for the absorption of sulfur dioxide and the oxidation reactions for the precipitation of gypsum are efficiently carried out in a small volume.

Consequently, a given amount of gas can be satisfactorily treated by using a reactor of smaller size than that used in the prior art, and a reduction in the flow space of the system can be achieved beyond the limits of the prior art. Moreover, a plurality of gas blowing means are not required as contrasted with conventional rotary atomizers. This can simplify the construction of the system, resulting in the reduced cost of the system and the facilitation of maintenance operations.

Furthermore, when the rotary joint and motor for use with the gas blowing means are disposed within the reactor, the rotating shaft need not extend through the wall of the reactor (pressure vessel). This eliminates the necessity of using a special seal which can withstand the pressure difference between the inside and outside of the reactor. A reduction in cost can also be achieved in this respect, resulting in the markedly reduced cost of the system and the facilitation of maintenance operations.

DETAILED DESCRIPTION OF PREFERRED EXAMPLE

One preferred example of the present invention will be described hereinbelow with reference to the accompanying drawings. However, it is to be understood that the present invention is not limited to the following example.

Figure 1:
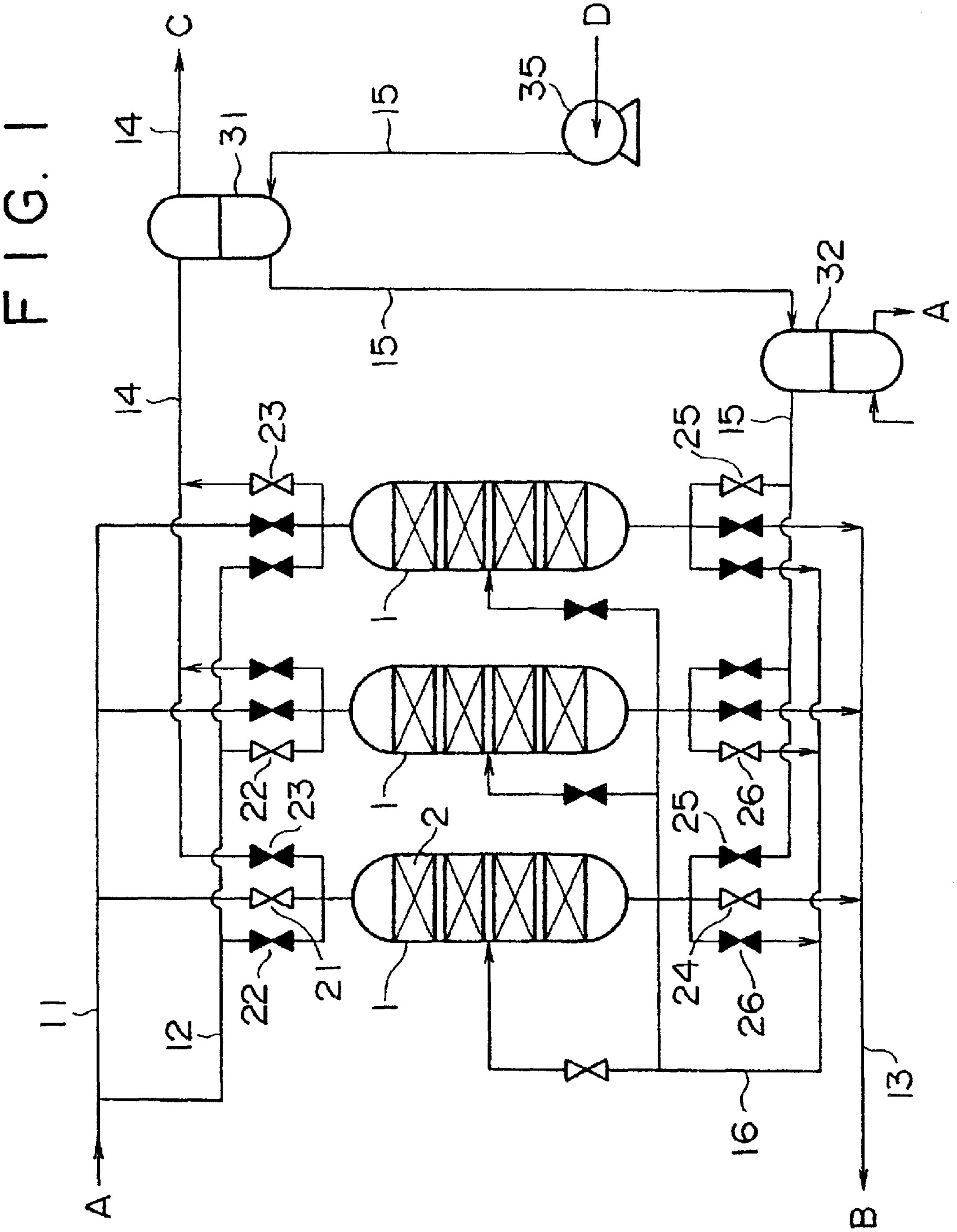
FIG. 1 is a flow diagram showing the construction of the gas refining section of a gas refining system in accordance with one example of the present invention.
Figure 2:
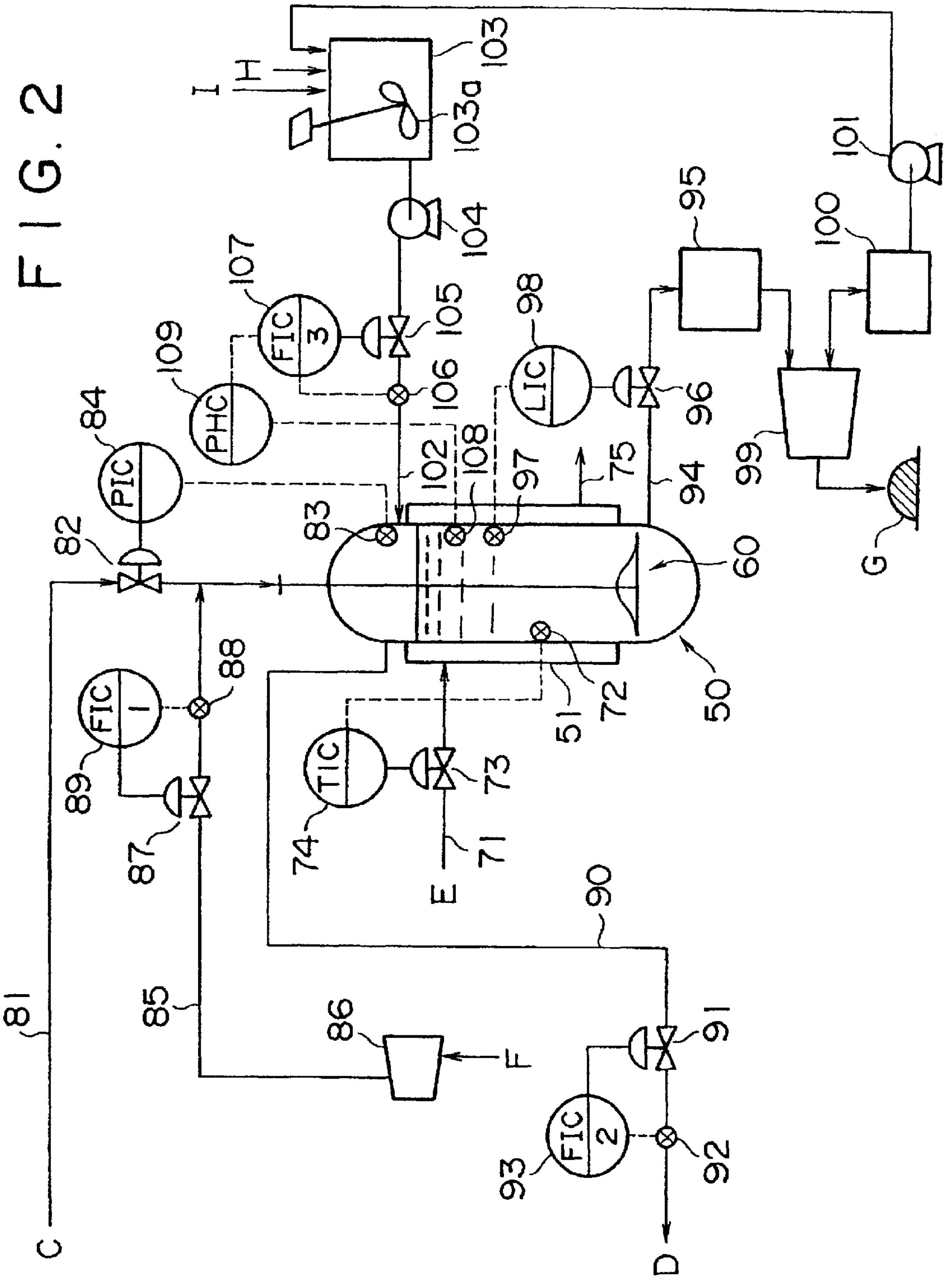
FIG. 2 is a flow diagram showing the construction of the gypsum recovery section of the same gas refining system.
Figure 3:
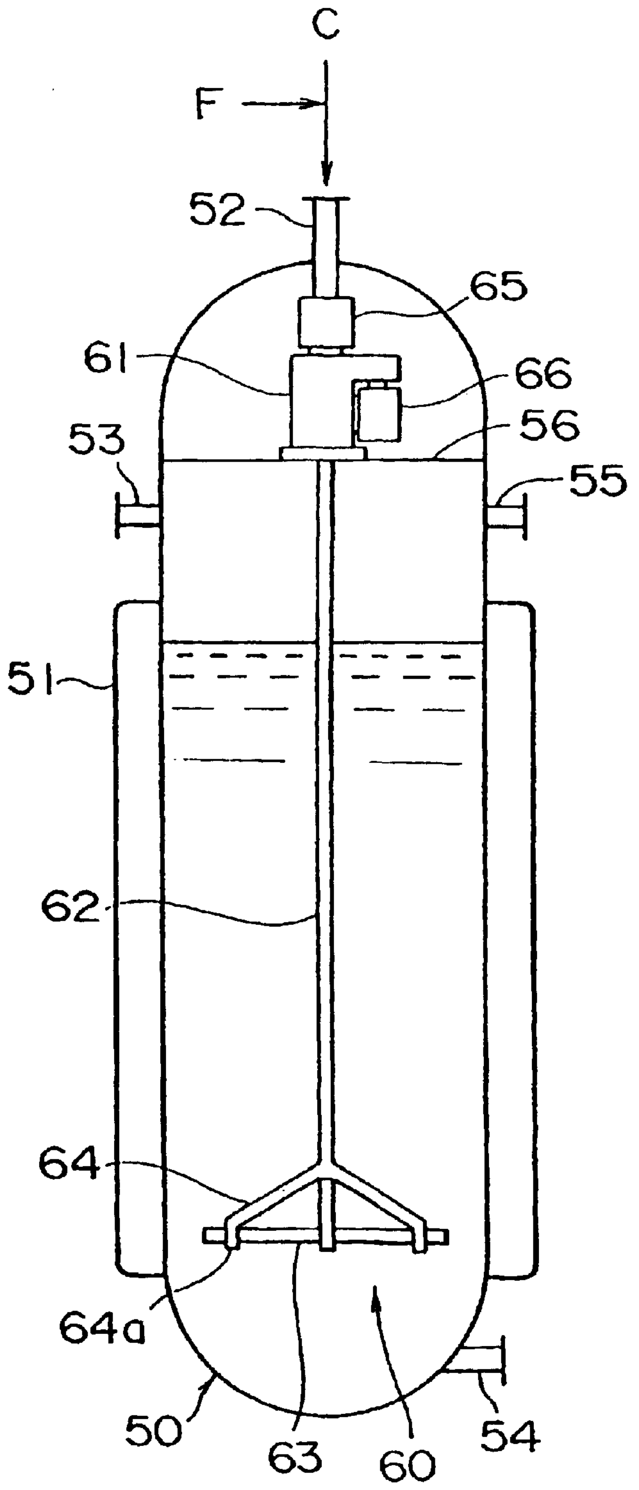
FIG. 3 is a schematic view showing the construction of a reactor included in the gypsum recovery section of the same gas refining system.
Figure 4:
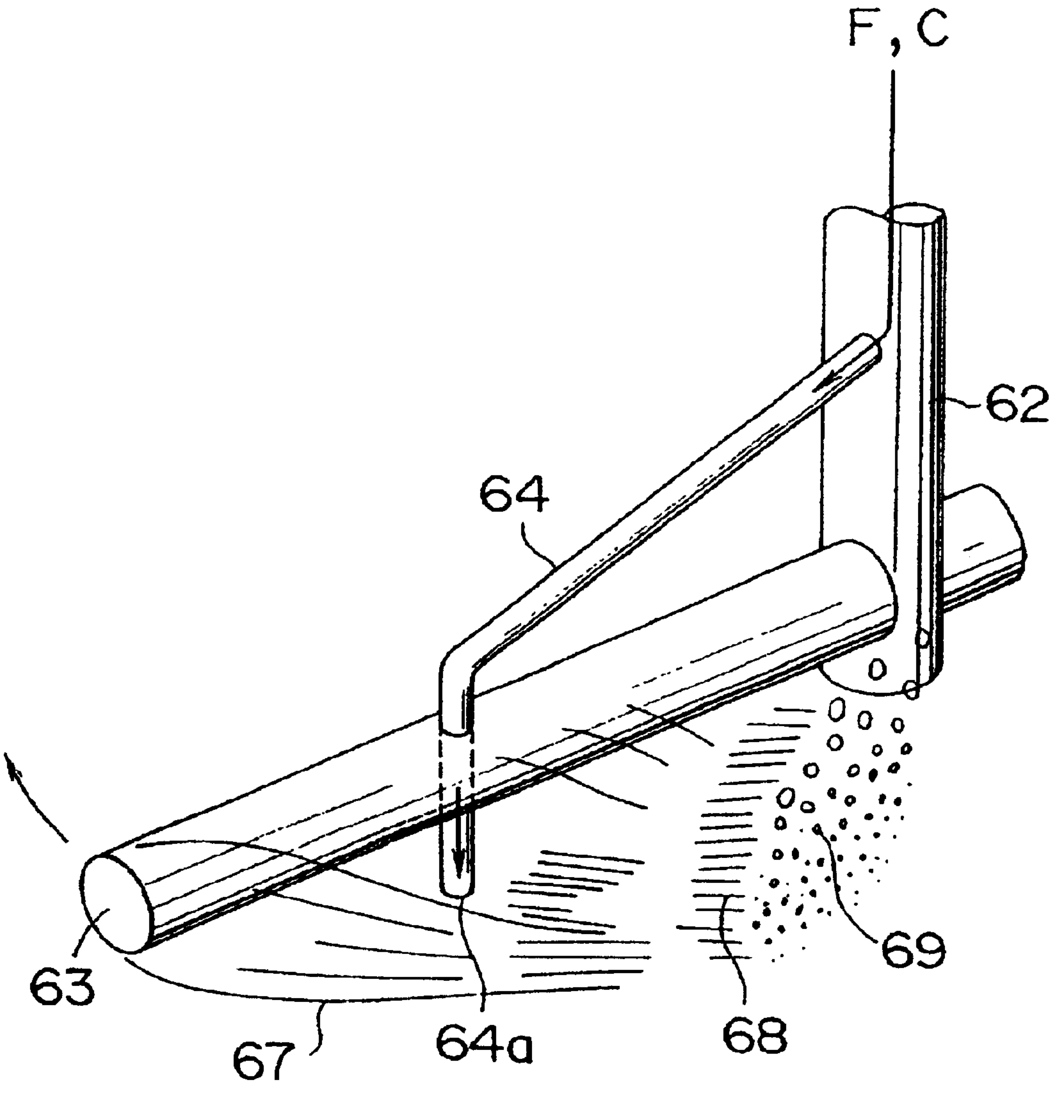
FIG. 4 is a schematic view showing the action of a gas blowing means installed in the reactor of the gypsum recovery section of the same gas refining system.

FIG. 1 is a flow diagram showing the construction of the gas refining section of a gas refining system in accordance with this example, FIG. 2 is a flow diagram showing the construction of the gypsum recovery section of the same gas refining system, FIG. 3 is a schematic view showing the construction of a reactor included in the gypsum recovery section of the same gas refining system, and FIG. 4 is a schematic view showing the action of a gas blowing means (i.e., a rotating-arm air sparger) installed in the reactor of the gypsum recovery section of the same gas refining system.

First of all, the construction of the gas refining section is explained.

As illustrated in FIG. 1, the gypsum recovery section of the gas refining system in accordance with this example includes three or more fixed-bed reaction columns 1. More specifically, this gas refining section is of a dry type having three fixed-bed reaction columns 1. Each of these reaction columns 1 comprises a pressure vessel which is loaded with a honeycomb adsorbent 2 comprising an oxide of a metal such as Fe, Zn, Mo, Mn, Cu or W and in which absorption, regeneration and reduction steps are successively carried out as will be described later. In the state shown in FIG. 1, the left-hand reaction column 1 is operating in the mode of the absorption step, the middle reaction column 1 is operating in the mode of the reduction step, and the right-hand reaction column 1 is operating in the mode of the regeneration step.

This gas refining section is provided with several gas pipe lines including a first gas inlet line 11 for introducing a high-temperature and high-pressure reducing gas A (hereinafter referred to as "the reducing gas A") to be refined (or freed of sulfur compounds) in order to carry out the absorption step which will be described later, a second gas inlet line 12 for introducing the reducing gas A in order to carry out the reduction step which will be described later, a refined gas outlet line 13 for discharging the refined high-temperature and high-pressure reducing gas B (hereinafter referred to as "the refined gas B"), a regeneration gas outlet line 14 for conducting the gas C discharged from the reaction column 1 operating in the mode of the regeneration step which will be described later (hereinafter referred to as "the regeneration gas C"), a regeneration recycle gas inlet line 15 for introducing a gas D to be supplied to the reaction column 1 operating in the mode of the regeneration step which will be described later (hereinafter referred to as "the regeneration recycle gas D"), and a reducing gas return line 16 for introducing the gas discharged from the reaction column 1 operating in the mode of the reduction step (hereinafter referred to as "the reducing gas") into the reaction column 1 operating in the mode of the absorption step.

Moreover, valves 21, 22 and 23 are installed so as to controllably connect the inlet port for the reducing gas A of each reaction column 1 with the aforesaid first gas inlet line 11, second gas inlet line 12 and regeneration gas outlet line 14, respectively. Similarly, valves 24, 25 and 26 are installed so as to controllably connect the outlet port for the reducing gas A of each reaction column 1 with refined gas outlet line 13, regeneration recycle gas inlet line 15 and reducing gas return line 16, respectively.

These valves are designed so that their operation is controlled by a controller (not shown) and they are opened or closed according to the type of the step carried out in each reactor. In FIG. 1, the valves represented by solid symbols are in the closed state and those represented by open symbols are in the opened state.

In the illustrated example, the gas refining section includes two heat exchangers 31 and 32 which are designed so as to heat the regeneration recycle gas D by the regeneration gas C in heat exchanger 31 and also heat the regeneration recycle gas D, for example, by the reducing gas A in heat exchangers 32. In this case, the gas refining section may be constructed so that the reducing gas A produced in a gasification furnace is passed through heat exchanger 32 before being introduced into first gas inlet line 11 and the like.

Moreover, a blower 35 for blowing the regeneration recycle gas D under pressure is installed on the upstream side of regeneration recycle gas inlet line 15.

Regeneration gas outlet line 14 is connected with the regeneration gas inlet line 81 of the gypsum recovery section illustrated in FIG. 2.

Next, the construction of the gypsum recovery section is explained with reference to FIG. 2.

As illustrated in FIG. 2, the gypsum recovery section of this system is of a wet type having a reactor 50 into which a calcium compound containing slurry (e.g., a limestone slurry in this case) is supplied, and a rotating-arm air sparger 60 which is supported in this reactor 50, is rotated by a motor (not shown), and serves to stir the slurry within reactor 50 and to blow the supplied gas (i.e., the mixed gas consisting of the regeneration gas C and air supplied from a compressor as will be described later) efficiently into the slurry in the form of fine bubbles.

The aforesaid reactor 50 is a substantially cylindrical pressure vessel which is equipped with a water-cooling jacket (or coolant passage) 51 at its periphery. This jacket 51 is designed so that cooling water (or coolant) E is supplied thereto through a cooling water supply line 71. In FIG. 3, reference numeral 52 designates a connecting pipe (or fixed pipe) for connecting reactor 50 with regeneration gas inlet line 81 and air supply line 85 as will be described later. This connecting pipe 52 extends through the top wall of reactor 50 and is connecting with a rotary joint 65 as will be described later. Similarly, in FIG. 3, reference numerals 53, 54 and 55 designate connecting pipes for connecting reactor 50 with regeneration recycle gas outlet line 90, slurry withdrawal line 94 and limestone slurry supply line 102 as will be described later, respectively.

As illustrated in FIG. 3, air sparger 60 comprises a driving/supporting device 61 installed on a supporting wall 56 disposed horizontally in the upper part of reactor 50; a hollow rotating shaft 62 having its upper end supported by a bearing (not shown) disposed within this driving/supporting device 61, and extending through the center of reactor 50 to the lower part thereof; a horizontal stirring rod 63 fixed to the lower end of this hollow rotating shaft 62; at least a gas supply pipe 64 extending from hollow rotating shaft 62 through stirring rod 63 and each having an open end 64*a* below stirring rod 63; a rotary joint 65 for connecting the upper end of hollow rotating shaft 62 with the aforesaid connecting pipe 52; and a motor 66 mounted on driving/supporting device 61 for driving hollow rotating shaft 62 into rotation through a power transmission mechanism (not shown) disposed within driving/supporting device 61. The rotational speed of hollow rotating shaft 62 is preset, for example, at a value of 50 to 150 rpm.

As illustrated in FIG. 2, the flow rate of the cooling water flowing through the jacket 51 of reactor 50 is regulated by a temperature controller 74 which receives the output signal of a temperature sensor 72 for detecting the temperature of the slurry within reactor 50 and controls the opening of a flow control valve 73 provided in cooling water supply line 71.

The aforesaid temperature controller 74 comprises an electric circuit having the function of controlling flow control valve 73 according to the deviation of the output value of temperature sensor 72 from a target value in such a direction as to cause the output value of temperature sensor 72 to agree with the target value. This control target value can be selectively preset, for example, so as to fall within a first temperature range (i.e., 120 to 160° C.) which causes α-gypsum hemihydrate to precipitate, or a second temperature range (i.e., 120° C. or below and preferably 100° C. or below) which causes gypsum dihydrate to precipitate.

That is, this temperature controller 74 sends a control signal to an actuator for driving flow control valve 73, and thereby controls the opening of flow control valve 73. For example, when its control target value is preset at a value (e.g., 140° C.) within the first temperature range which causes α-gypsum hemihydrate to precipitate, temperature controller 74 functions to change the value of the control signal in such a way that, if the output value of temperature sensor 72 rises above 140° C., the opening of flow control valve 73 is increased according to the degree of rise, while if the output value of temperature sensor 72 falls below 140° C., the opening of flow control valve 73 is decreased according to the degree of fall.

The cooling water supplied to jacket 51 removes heat from reactor 50 and then drained through a drain line 75. Thus, jacket 51, cooling water supply line 71, temperature sensor 72, flow control valve 73, temperature controller 74 and the like constitute the temperature control means of the present invention.

To rotating-arm air sparger 60, the regeneration gas C is supplied through regeneration gas inlet line 81, which is connected with the aforesaid regeneration gas outlet line 14, and connecting pipe 52. This regeneration gas inlet line 81 is provided with a flow control valve 82, and its opening is regulated under the control of a pressure controller 84 on the basis of the output value of a pressure sensor 83 so that the pressure within reactor 50 may be adjusted to a predetermined value.

To rotating-arm air sparger 60, air F is also supplied through air supply line 85 and connecting pipe 52 by a compressor 86. This air supply line 85 is provided with a flow control valve 87, and its opening is regulated under the control of a first flow controller 89 on the basis of the output value of a flow sensor 88 so that the feed rate of air may be adjusted to a predetermined value which will be described later. Thus, the oxygen feed rate control means of the present invention comprises flow control valve 87, flow sensor 88 and first flow controller 89.

Regeneration recycle gas outlet line 90 is connected with the upper part of reactor 50 (i.e., connecting pipe 53), so that the gas produced by blowing a mixture of the regeneration gas C and air into reactor 50 and causing sulfur dioxide to be absorbed into the slurry (i.e., the regeneration recycle gas D) can be supplied to the blower 35 of the gas refining section of FIG. 1 through this regeneration recycle gas outlet line 90. This regeneration recycle gas outlet line 90 is provided with a flow control valve 91. Under the control of a second flow controller 93 on the basis of the output value of a flow sensor 92, the opening of flow control valve 91 is regulated so that the feed rate of the regeneration recycle gas D will be adjusted to a predetermined value.

This regeneration recycle gas outlet line 90 may be provided with a mist eliminator so that mist present in the gas discharged from reactor 50 (i.e., mist formed from the slurry within reactor 50) will be separated and returned to reactor 50.

Moreover, slurry withdrawal line 94 is connected with the lower part of reactor 50 (i.e., connecting pipe 54), so that the slurry within reactor 50 can be withdrawn into a separator supply tank 95. This slurry withdrawal line 94 is provided with a flow control valve 96. Under the control of a level controller 98 on the basis of the output value of a level sensor 97 for detecting the liquid level within reactor 50, the opening of flow control valve 96 is regulated so that the liquid level within reactor 50 will be adjusted to a predetermined value.

The slurry within separator supply tank 95 is introduced into a solid-liquid separator 99 and subjected to solid-liquid separation therein. Thus, its solid component (i.e., gypsum G) is collected, while the filtrate is transferred to a filtrate tank 100 and then supplied, by means of a pump 101, to a limestone slurry tank 103 which will be described later. The solid-liquid separator 99 used for this purpose can be of a continuous centrifugation type.

Furthermore, a limestone slurry feed line 102 for feeding a limestone slurry is connected with the upper part of reactor 50 (i.e., connecting pipe 55) so that the limestone slurry within limestone slurry tank 103 may be fed to reactor 50 by means of a pump 104. Owing to the function of a level controller (not shown) and the like, the filtrate within filtrate tank 100 and make-up water H are supplied to limestone slurry tank 103 so that the liquid level within limestone slurry tank 103 will be kept approximately constant, and powdered limestone I ($CaCO_3$) is suitably supplied from a silo (not shown) to limestone slurry tank 103 in an amount corresponding to the feed rate of such water. In addition, limestone slurry tank 103 is provided with a stirrer 103*a* for mixing limestone with water. Pump 104 comprises, for example, a plunger pump and serves to pressurize the limestone slurry and introduce it into reactor 50 under pressure.

This limestone slurry feed line 102 is provided with a flow control valve 105. Under the control of a third flow controller 107 on the basis of the output value of a flow sensor 106, the opening of flow control valve 105 is regulated so that the feed rate of the limestone slurry will be adjusted to a predetermined value.

In the illustrated example, the control target value of third flow controller 107 is suitably changed in response to an output signal sent by a pH controller 109 on the basis of the output value of a pH sensor 108 for detecting the pH value of the slurry within reactor 50. Thus, the feed rate of the limestone slurry is controlled so that the pH value of the slurry within reactor 50 will be maintained at the optimum value (e.g., pH 5–6) which allows the absorption and oxidation reactions within reactor 50 (as will be described later) to proceed efficiently.

Next, the gas refining and gypsum recovery operations carried out in the gas refining system constructed in the above-described manner are explained.

In an electric power generating system or the like, the gas produced in a gasification furnace (not shown) typically has a temperature of 1,000 to 2,000° C. immediately after the outlet of the furnace. By undergoing heat recovery with a steam heater (not shown) which is usually installed on the outlet side of the furnace, this gas is cooled to a temperature of about 250 to 550° C. and then dedusted with a dust separator (not shown). Thereafter, this gas is fed to the gas refining section of FIG. 1 as the reducing gas A.

This reducing gas A consists essentially of hydrogen ($H_2$) and carbon monoxide (CO), and usually contains sulfur compounds such as hydrogen sulfide ($H_2S$) and carbonyl sulfide (COS) at a concentration of several tens to several thousands of parts per million. Its pressure is as high as about 25 to 30 kg/cm$^2$.

A large portion of the reducing gas A fed to the aforesaid gas refining section is conducted through first gas inlet line 11 and valve 21 and introduced into one of reaction columns 1 (i.e., the left-hand reaction column 1 in FIG. 1), where it is effectively contacted with a honeycomb adsorbent (e.g., $Fe_3O_4$). Thus, the hydrogen sulfide ($H_2S$) and carbonyl sulfide (COS) are absorbed and removed as iron sulfide, for example, by the absorption reactions represented by the following equations (1) and (2). Thereafter, the resulting gas is discharged as the refined gas B through valve 24 and refined gas outlet line 13, and fed to downstream equipment (e.g., a gas turbine) in the electric power generating system or the like.

$$3H_2S+Fe_3O_4+H_2\rightarrow 3FeS+4H_2O \quad (1)$$

$$3COS+Fe_3O_4+CO\rightarrow 3FeS+4CO_2 \quad (2)$$

On the other hand, some of the reducing gas A fed to the gas refining section is conducted through second gas inlet line 12 and valve 22 and introduced into the reaction column 1 operating in the mode of the reduction step (i.e., the middle reaction column 1 in FIG. 1), where it is effectively contacted with the regeneration adsorbent (e.g., $Fe_2O_3$). Thus, the adsorbent is converted into a form having absorbing power (e.g., $Fe_3O_4$), for example, by the reduction reactions represented by the following equations (3) and (4). After leaving the reaction column 1 operating in the mode of the reduction step, this portion of the reducing gas A is conducted through valve 26 and reducing gas return line 16 and introduced into the middle part of the reaction column 1 operating in the mode of the absorption step, where hydrogen sulfide ($H_2S$) and carbonyl sulfide (COS) are absorbed and removed by the above-described absorption reactions. The resulting gas is discharged as the refined gas B through valve 24 and refined gas outlet line 13. Alternatively, this portion of the reducing gas A may be returned, for example, to the inlet port of the reaction column 1 operating in the mode of the absorption step.

$$3Fe_2O_3+H_2\rightarrow 2Fe_3O_4+H_2O \quad (3)$$

$$3Fe_2O_3+CO\rightarrow 2Fe_3O_4+CO_2 \quad (4)$$

In the remaining reaction column 1 (i.e., the right-hand reaction column 1 in FIG. 1), the regeneration step of roasting the adsorbent having been converted into iron sulfide is carried out at the same time with the above-described absorption and reduction steps. That is, the regeneration recycle gas D is conducted through regeneration recycle gas inlet line 15 and valve 25 and introduced into the remaining reaction column 1, where the adsorbent is reacted with oxygen present in the regeneration recycle gas D and regenerated by the roasting reaction represented by the following equation (5).

$$4FeS+7O_2\rightarrow 2Fe_2O_3+4SO_2 \quad (5)$$

The regeneration gas C produced in this regeneration step, which contains a high concentration (e.g., about 0.5 to 10%) of sulfur dioxide ($SO_2$), is fed to the gypsum recovery section of FIG. 2 through valve 23 and regeneration gas outlet line 14.

This regeneration gas C consists mainly (e.g., about 85 to 95%) of nitrogen ($N_2$) and contains very small amounts of carbon dioxide, water and oxygen in addition to sulfur dioxide ($SO_2$). Its pressure is usually in the range of, for example, about 10 to 25 kg/cm$^2$ and its temperature is usually of the order of 600° C. Even after being cooled by heat exchanger 31, the regeneration gas C is fed to the gypsum recovery section of FIG. 2 as a high-temperature/high-pressure gas having a temperature of the order of 400° C.

The regeneration gas C fed to the aforesaid gypsum recovery section is conducted through regeneration gas inlet line 81 with its flow rate being regulated by pressure controller 84 and flow control valve 82, and mixed with air F supplied through air supply line 85. Then, by means of rotating-arm air sparger 60, the resulting gaseous mixture is blown into the slurry within reactor 50 in the form of fine bubbles.

More specifically, as illustrated in FIGS. 3 and 4, the regeneration gas C and air F are introduced into hollow rotating shaft 62 under pressure through connecting pipe 52 and rotary joint 65, and injected from the open end 64*a* of gas supply pipe 64. Thus, as illustrated in FIG. 4, they are supplied to gas-phase areas 67 created on the back side of stirring rod 63 as a result of its rotation. At the tail ends 68 of these gas-phase areas 67, the regeneration gas C and air F supplied to gas-phase areas 67 are subjected to a scattering action exerted by vortex forces resulting from the rotation of stirring rod 63. Thus, a large number of substantially uniform fine bubbles 69 are continuously formed at the tail ends 68 of gas-phase areas 67 and dispersed in the slurry. These bubbles 69 are distributed over a wide area swept by the rotating stirring rod 63 (i.e., extending over substantially the whole width of reactor 50) and dragged into the flow of the slurry stirred by stirring rod 63, so that they ascend through the slurry within reactor 50 and come into efficient contact therewith.

Consequently, most of the sulfur dioxide contained in the regeneration gas C introduced into reactor 50 is absorbed into the slurry within reactor 50. Finally, the clean gas from which sulfur dioxide has been removed to a high degree, together with unreacted air, is discharged through regeneration recycle gas outlet line 90 and supplied to the gas refining section as the regeneration recycle gas D.

On the other hand, the slurry having absorbed sulfur dioxide present in regeneration gas C is brought into contact with oxygen present in the air blown thereinto, so that the sulfur dioxide is completely oxidized and then undergoes a neutralization reaction to form gypsum.

During this process, by utilizing the high pressure of regeneration gas C, the pressure within reactor 50 is maintained at a high level, for example, of the order of 5 to 25 kg/cm$^2$ under the control of the aforesaid pressure controller 84. Thus, the aforesaid absorption and oxidation reactions can be efficiently carried out in a small gas volume.

Owing to the high temperature of the regeneration gas C and the evolution of heat by the above-described absorption and oxidation reactions, the temperature of the slurry within reactor 50 will become very high unless it is properly controlled. Accordingly, the flow rate of the cooling water supplied to the aforesaid jacket 51 is regulated by temperature controller 74, so that the temperature of the slurry within reactor 50 can be adjusted to a desired value of 160° C. or less which is suitable for the precipitation of a given form of gypsum.

Thus, when the control target value of temperature controller 74 is preset at a value within the second temperature range (i.e., 120° C. or below and preferably 100° C. or below) which causes gypsum dihydrate to precipitate, the predominant reactions which occur within reactor 50 are those represented by the following equations (6) to (8), and the form of gypsum which precipitates during the aforesaid neutralization reaction is gypsum dihydrate.

$$SO_2+H_2O\rightarrow H^++HSO_3^- \quad (6)$$

$$H^+HSO_3^-+1/2O_2\rightarrow 2H^++SO_4^{2-} \quad (7)$$

$$2H^++SO_4^{2-}+CaCO_3+H_2O\rightarrow CaSO_4.2H_2O+CO_2 \quad (8)$$

When the control target value of temperature controller 74 is preset at a value within the first temperature range (i.e., 120° C. to 160° C.) which causes α-gypsum hemihydrate to precipitate, the predominant reactions which occur within reactor 50 are those represented by the aforesaid equations (6) and (7) and by the following equation (9), and the form of gypsum which precipitates is α-gypsum hemihydrate.

$$2H^{+}+SO_4^{2-}+CaCO_3+1/2H_2O\rightarrow\alpha\text{-}CaSO_4.1/2H_2O+H_2O+CO_2 \quad (9)$$

During this process, the flow rate of the air supplied through air supply line 85 is continuously adjusted to a value taking into consideration the amount of oxygen required to oxidize and eliminate the sulfurous acid dissolved in the slurry within reactor 50 and the amount of oxygen required in the regeneration step of the gas refining section, by controlling the opening of flow control valve 87 by means of first flow controller 89.

More specifically, in this example, oxygen present in the air supplied through air supply line 85 also needs to be supplied to the gas refining section by being contained in the regeneration recycle gas D, and used in the regeneration step of the gas refining section. Accordingly, an amount of air corresponding to the amount of oxygen required in the regeneration step is added to the control target value for the aforesaid flow rate of air, for example, in response to a command sent from the controller (not shown) of the gas refining section to first flow controller 89.

The amount of oxygen required to oxidize and eliminate the sulfurous acid dissolved in the slurry within reactor 50 can be determined on the basis of the correlation between sulfurous acid concentration and oxidation-reduction potential, for example, by detecting the oxidation-reduction potential of the slurry.

As a result of the reactions represented by the above equations (6) to (9), gypsum and a minor amount of limestone ($CaCO_3$) used as absorbent are steadily suspended in the slurry. This slurry is withdrawn through slurry withdrawal line 94 and transferred to separator supply tank 95.

The slurry within separator supply tank 95 is introduced into solid-liquid separator 99 and subjected to solid-liquid separation therein. Thus, its solid component (i.e., gypsum G) is collected, while the filtrate is transferred to filtrate tank 100 and then recycled to limestone slurry tank 103 by means of pump 101.

A limestone slurry is fed through limestone slurry feed line 102 to reactor 50 by means of pump 104, and its feed rate is controlled by pH controller 109 and flow control valve 105 of third flow controller 107. For example, third flow controller 107 also receives detection signals sent from sensors (not shown) for detecting the flow rate of the regeneration gas C introduced into reactor 50 and the concentration of sulfur dioxide therein. Basically, third flow controller 107 calculates the required feed rate (based on the stoichiometric amount) of the absorbent (i.e., limestone in this case) on the basis of the output values of these sensors, presets the control target flow rate of the limestone slurry at a value corresponding to this required feed rate, and thereby control the opening of flow control valve 105. In addition to this basic operation, the control target flow rate is also controlled by pH controller 109. Specifically, if the pH value of the slurry within reactor 50 falls below a preset value (e.g., of 5), an additional absorbent feed rate corresponding to the proportional sensitivity is calculated and added to the control target flow rate. Thus, the pH value of the slurry within reactor 50 is always maintained at its optimum value.

As described above, in the illustrated example of the gas refining system, the regeneration gas C containing a large amount of sulfur dioxide and air F are introduced into reactor 50 under an elevated pressure, and air for oxidizing use and a limestone slurry used as absorbent are efficiently supplied in their optimum flow rates which are continuously controlled so as to leave essentially no excess or deficiency. Moreover, owing to the function of the aforesaid temperature controller 74, the temperature of the slurry within reactor 50 is selectively controlled so as to fall within a first temperature range (i.e., 120 to 160° C.) which causes α-gypsum hemihydrate to precipitate or a second temperature range (i.e., 120° C. or below and preferably 100° C. or below) which causes gypsum dihydrate to precipitate. Furthermore, after being introduced into reactor 50, the regeneration gas C and air F are blown into the slurry within reactor 50 by means of air sparger 60 and distributed throughout the slurry in the form of fine bubbles. Thus, the aforesaid reactions for the absorption of sulfur dioxide and the aforesaid oxidation reactions for the precipitation of gypsum are efficiently carried out in a small volume.

Consequently, either α-gypsum hemihydrate of high purity and good quality or gypsum dihydrate of high purity and good quality can be selectively and easily formed as a by-product according to circumstances, by changing the preset control target value of temperature controller 74. This is advantageous from the viewpoint of profit recovery by the by-product and other factors. For example, only when there is a sufficient demand for α-gypsum hemihydrate in the market, α-gypsum hemihydrate may be produced and sold soon. Thus, the trouble of storing α-gypsum hemihydrate can be saved and, moreover, the recovery of a large profit can be achieved by making the most of the high utility value inherently possessed by α-gypsum hemihydrate. Alternatively, when there is a poor demand for (or an excessive supply of) α-gypsum hemihydrate, the by-product may be switched over to gypsum dihydrate which is easy to store and convey. By selling this gypsum dihydrate at an appropriate opportunity, a reasonable profit can be gained without taking much trouble.

Moreover, in the illustrated example of the gas refining system, the gas produced over the surface of the slurry within reactor 50 [i.e., a mixture of the regeneration gas C blown into the slurry and freed of sulfur dioxide by absorption during its ascent through the slurry, and the air F (or the oxygen-containing gas) blown into the slurry and left unreacted] is discharged from reactor 50 as the regeneration recycle gas D and recycled for use as the oxygen-containing gas in the roasting reaction of adsorbent 2 in the gas refining section.

On the other hand, by use of the oxygen feed rate control means (i.e., flow control valve 87, flow sensor 88 and first flow controller 89), the flow rate of air F blown into the slurry within reactor 50 is continuously adjusted to a value corresponding to the sum of the amount of oxygen required to completely oxidize the sulfurous acid absorbed into the slurry within reactor 50 and the amount of oxygen required for the roasting reaction of the aforesaid adsorbent 2.

Consequently, part of the oxygen present in the air blown into the slurry within reactor 50 (i.e., the oxygen which has not reacted within reactor 50) is used in the roasting reaction of the adsorbent and its amount is continuously adjusted to the amount which is necessary and sufficient for the roasting reaction.

For this reason, it is unnecessary to install a separate air supply line which is connected, for example, to an appropriate point on regeneration recycle gas inlet line 15 and used to supply air thereto, and air can be supplied to the whole system by using a single air supply line (i.e., air supply line 85). This is effective in simplifying the piping design and equipment construction of the system and, in turn, achieving a reduction in the size and cost of the system.

Moreover, a given amount of gas can be satisfactorily treated by using reactor 50 of smaller size than that used in the prior art, and a reduction in the flow space of the system can be achieved beyond the limits of the prior art. In addition, only one of the aforesaid air sparger 60 is needed as the gas blowing means. This can simplify the construction of the system, resulting in the reduced cost of the system and the facilitation of maintenance operations.

Furthermore, in the illustrated example, rotary joint 65 and motor 66 for use with air sparger 60 are disposed within reactor 50, and the rotating shaft need not extend through the wall of reactor 50. This eliminates the necessity of using a special seal. A reduction in cost can also be achieved in this respect, resulting in the markedly reduced cost of the system and the facilitation of maintenance operations.

It is to be understood that the present invention is not limited to the above-described example but may be practiced in various ways. For example, the temperature control means of the present invention is not limited to the construction of the illustrated example in which cooling water is passed through the jacket formed around the reactor, but may be constructed so that a coolant is passed through heat transfer tubes disposed within the reactor.

Moreover, it goes without saying that the reaction columns used in the gas refining section may be of any desired type other than the fixed-bed type (e.g., the fluidized-bed or moving-bed type).

Furthermore, the gas blowing means of the present invention is not limited to the construction shown in the illustrated example wherein the stirring rod and the gas supply pipes comprise separate members, but the gas supply pipes may be formed so as to function as a stirring rod. In other words, it is also possible to use a hollow stirring rod having openings or nozzles formed therein so that the regeneration gas and other gas introduced into the stirring rod under pressure may be injected from these openings or nozzles.

In addition, a large number of openings for injecting the regeneration gas and other gas from the gas supply pipes (e.g., open ends 64*a* in the illustrated example) may be formed in different positions along the length of the stirring rod. Even where the diameter of the reactor is enlarged because of an increase in the amount of gas to be treated, the regeneration gas and other gas can be efficiently blown into the whole internal space of the reactor by using only one of this gas blowing means, provided that the length of the stirring rod is increased according to the internal diameter of the reactor and a larger number of openings for injecting the regeneration gas and other gas are formed as required.

Although the open ends 64*a* of gas supply pipes 64 extend downward in the illustrated example, it is a matter of course that the present invention is not limited to this configuration. However, it is to be understood that this configuration permits splashes of the slurry entering the pipes against the flow of gas to be expelled quickly from the pipes, thus preventing the deposition of scale on the inner wall of the pipes.

What is claimed is:

1. A gas refining method for adsorbing a reducing gas obtained by pressure gasification of coal or oil, said method comprising the steps of:

providing a reducing gas stream comprising sulfur-containing compounds obtained by gasification of a coal or oil;

introducing the reducing gas stream into an adsorbing and removing zone;

contacting the reducing gas stream with an adsorbent contained within the adsorbing and removing zone;

adsorbing the sulfur-containing compounds onto the adsorbent in said zone;

introducing a first oxygen-containing gas stream into the adsorbing and removing zone;

contacting the first oxygen-containing gas stream with the adsorbent having sulfur compounds absorbed thereon to form a regeneration gas containing sulfur dioxide;

bringing the regeneration gas, a second oxygen-containing gas stream, and a calcium-containing liquid slurry stream into gas-liquid contact in a second zone to effect absorption of sulfur dioxide by said liquid slurry and precipitation of a gypsum compound selected from the group consisting of α-gypsum hemihydrate and gypsum dihydrate from said liquid slurry; and varying the temperature of the calcium-containing liquid slurry stream in said second zone between a first predetermined temperature range which causes selective precipitation of α-gypsum hemihydrate and a second predetermined temperature range which causes selective precipitation of gypsum dihydrate.

2. A method according to claim 1, wherein said step of varying the temperature of the calcium-containing liquid slurry comprises:

measuring the temperature of the calcium-containing liquid slurry in the second zone;

passing a coolant through a coolant passage around the second zone; and varying the flow of coolant through the coolant passage such that the temperature of the liquid slurry is maintained within either the first predetermined temperature range or the second predetermined temperature range.

3. A method according to claim 1, further comprising the steps of:

withdrawing a regeneration recycle gas from the second zone, wherein a calcium compound-containing liquid slurry having sulfurous acid absorbed therein is located within the second zone;

recycling the regeneration recycle gas for use as the first oxygen-containing gas stream; and adjusting the flow of the second oxygen-containing gas stream to a value corresponding to a sum of an amount of oxygen required to completely oxidize sulfurous acid absorbed into the calcium compound-containing liquid slurry and an amount of oxygen required for use in the first oxygen-containing stream.

4. A method according to claim 2, further comprising the steps of:

withdrawing a regeneration recycle gas from the second zone, wherein a calcium compound-containing liquid slurry having sulfurous acid absorbed therein is located within the second zone;

recycling the regeneration recycle gas for use as the first oxygen-containing gas stream; and adjusting the flow of the second oxygen-containing gas stream to a value corresponding to a sum of an amount of oxygen required to completely oxidize sulfurous acid absorbed into the calcium compound-containing liquid slurry and an amount of oxygen required for use in the first oxygen-containing stream.

5. A method according to claim 1, wherein the regeneration gas enters the second zone at a pressure greater than atmospheric pressure.

6. A method according to claim 1, wherein the first predetermined temperature range is 120° C. to 160° C.

7. A method according to claim 1, wherein the second predetermined temperature range is less than 120° C.

* * * * *

UNITED STATES PATENT AND TRADEMARK OFFICE

CERTIFICATE OF CORRECTION

PATENT NO. : 6,896,858 B2 
DATED : May 24, 2005
INVENTOR(S) : Tatani et al.

It is certified that error appears in the above-identified patent and that said Letters Patent is hereby corrected as shown below:

Title page,
Item [57], ABSTRACT,
Line 13, “60 –gypsum” should read -- $\alpha$-gypsum --.

Signed and Sealed this

Twenty-third Day of August, 2005

JON W. DUDAS
*Director of the United States Patent and Trademark Office*